United States Patent Office 2,960,496
Patented Nov. 15, 1960

2,960,496

PROCESS FOR INHIBITING CROSS-LINKAGES IN POLYETHYLENE BY THE USE OF ALKYLATED HYDROXYANISOLES OR SUBSTITUTED PHENYL AMINES

Richard O. Elder, Wilmington, Del., assignor to E. I. du Pont de Nemours and Company, Wilmington, Del., a corporation of Delaware No Drawing. Filed Aug. 19, 1953, Ser. No. 375,290

10 Claims. (Cl. 260—94.9)

This invention relates to a process for the polymerization of ethylene to solid polymers and more particularly to an improved process for the polymerization of ethylene wherein polymerization is controlled and a superior product produced.

Numerous processes have been described for the preparation of ethylene polymers since the early disclosures in U.S. Patent 2,153,553 of Fawcett et al., issued April 11, 1939, and U.S. Patent 2,188,465 of Perrin et al., issued January 30, 1940. More recently continuous processes have been described in which ethylene is compressed to a liquid, the pressure of the liquid ethylene raised from 50 to 3000 atmospheres or above and after the addition of suitable polymerization catalysts the thus compressed ethylene is subjected to suitable polymerization temperatures. Such processes are described in U.S. Patent 2,395,381 of Squires, issued February 19, 1946, and U.S. Patent 2,396,791 of Krase et al., issued March 19, 1946. The reaction mixture from the above and similar polymerization reactions invariably contains unused catalyst or catalysts that provide free radicals in the reaction mixture after the product is discharged from the reactors. The catalysts and free radicals produced therefrom have a degrading influence on the polymers. The process of this invention obviates these deficiencies of prior art processes.

An object of the present invention is to provide an improved process for the polymerization of ethylene to solid polymers. Another object is to provide a process for improving the product stability of ethylene polymers. Yet another object is to provide means of overcoming long-chain branching, cross-linking and oxidation of the polymers of ethylene before, during and after their discharge from the ethylene polymerization reaction zone. A further object is to provide a method of destroying the free-radical effectiveness prior to discharging an ethylene polymerization reaction mixture from the reaction zone. Still another object is to provide a method of avoiding degradation of the polymer by free radical action after the reaction has been completed. Other objects and advantages of the invention will hereinafter appear.

It has been found that certain agents, herein generally referred to as polymerization decelerators and more fully characterized below, are effective to inhibit incipient activity and suppress the degrading influence of peroxygen catalysts as well as free radical polymerization catalysts generally after the ethylene polymerization reaction. It has been found that free radicals present in the reaction mixture with the polymerized homopolymer or copolymer of ethylene degrade the polymers as they are being discharged from the polymerization reactors by either catalyzing the formation of cross-linkages in the polymers, promoting chain branching or both. Even trace amounts of these agents inhibit cross-linking in the presence of free radical producing catalysts and when present in larger amounts the agents have a desired stabilizing influence on the solid polymers produced during the reaction.

A further feature of the invention rests on the surprising and unexpected influence of the decelerators to permit a high degree of working in the let-down valve through which the reaction product is discharged from the reactor. This amount of working, when carried out with the ethylene polymer mixed with a dispersant and a dispersing medium, produces a superior dispersion directly from the polymerization reactor.

In the examples which follow preferred embodiments of the invention are described in which parts are by weight unless otherwise stated.

*Example 1.*—A continuous process for the polymerization of ethylene was conducted in a tubular reactor of $3/16$ inch I.D. and 34 feet in length. Into the inlet end of this reactor ethylene was introduced under a pressure of 1200 atmospheres developed by a multi-stage compressor. The ethylene fed to the compressor contained about 10 p.p.m. of t-butyl-p-hydroxy-anisole. No prepolymerization occurred in any stage of the compressor. As the pressurized ethylene was passed along the preheating portion of the tubular reactor its temperature was raised to approximately 100° C. At this point in the reactor 0.02% of diethyl dioxide was introduced, based on the weight of ethylene, together with 10 parts of water per part of ethylene. The catalyst and water were forced under a pressure of about 1200 atmospheres into the moving stream of ethylene passing through the reactor. After the addition of catalyst the reaction took place rapidly, the exothermic heat of reaction being removed by means of a cooling jacket, the temperature being maintained thereby at about 110° C. Prior to the discharge of the reaction product through a let-down valve from the reactor and to atmospheric pressure, 50 p.p.m. of t-butyl-p-hydroxyanisole was added together with 0.02% turkey red oil based on the weight of ethylene. There issued from the exit of the let-down valve of the reaction a highly stable dispersion of ethylene polymer, the molecule of which had a minimum of chain branching, substantially no cross-links and no evidence of oxidation.

*Example 2.*—The reaction described in Example 1 was repeated except that no turkey red oil was added prior to the discharge of the ethylene polymer from the reaction zone. The product of the reaction was discharged as a flocculant polymer of ethylene which upon separation from the water present also was found to have a minimum of chain branching, substantially no cross-linkages and no detectable degradation due to oxidation.

The polymerization can be carried out under known pressure and temperature conditions. These conditions can range from 30 to 3000 atmospheres and from temperatures up to 240° C., the preferred range being from 600 to 1500 atmospheres and temperatures between 75° and 150° C.

Any suitable catalysts may be used for the reaction such as are well known in the art of ethylene polymerization. For example, a dialkyl dioxide such as ethyl propyl dioxide, dipropyl dioxide as well as the peroxygen type catalysts, such, for example, as hydrogen peroxide, persuccinic peroxides, percarbonates and urea peroxide may be used. Azo catalysts such as are described in the Hunt U.S. Patent 2,471,959, issued May 31, 1949, may be used or any suitable catalyst that provides free radicals for the polymerization reaction.

While the reactions of the examples are described as taking place in the presence of water, any other suitable reaction medium well known to the art may be employed, such, for example, as benzene, chlorobenzene, tertiary butanol and the like or the reaction may be conducted in the absence of a reaction medium. If desired, the decelerators may be and preferably are added dissolved in these solvents.

The polymerization decelerators which may be used in accord with the process of this invention include more particularly alkylated hydroxyanisoles having the general formula:

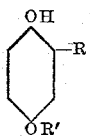

in which R and R' are similar or dissimilar alkyl or substituted alkyl groups and more particularly the lower alkyl groups such as methyl, ethyl, propyl, isopropyl, butyl, cyclohexyl and the like. The preferred polymerization decelerators are the 2-tertiary alkyl-4 alkoxy phenols such as t-butyl-p-hydroxyanisole. Other polymerization decelerators may be employed, such, for example, as the substituted phenyl amines, e.g., octyl-phenylamine, octadecylphenylamine, p,p'-diamino-diphenyl methane, triphenylamine, alpha- and beta-naphthylamines, decyl-beta-naphthylamine, dodecyl-alpha-naphthylamine, octadecyl-beta-naphthylamine, N,N'-phenyl-naphthyl-ethylene, diamine, symmetrical dinaphthyl-ethylene diamine, diphenyl paraphenylenediamine and the like. These adjuvants are, as has been emphasized, polymerization decelerators for they will not absolutely stop all polymerization if catalysts are used. Polymerization and copolymerization will take place in their presence even when they are present in excess, i.e., when they are present with a catalyst for the polymerization and present in amounts more than enough to react with all the free radicals produced by the catalyst.

The aforesaid and equivalent polymerization decelerators may be added to the ethylene prior to its introduction into the reaction zone, during the reaction or prior to the release of polymerization pressure. It is essential that the decelerator be added to the extent of from 10 to 200 p.p.m. of the ethylene polymer and be thoroughly mixed with the polymer. Effective thorough mixing is facilitated by early addition of the decelerator, preferably well before discharge of the reaction pressure. Moreover, the utility of the polymers, especially for extrusion, wire coating and like operations involving extreme working of the polymer, is enhanced by the discharge of the polymer from the reaction zone through a let-down valve or other discharge device of a similar nature, the decelerator being present during the passage of the polymer through the valve.

The table given below illustrates the effectiveness of these transfer agents when measured by the speed at which the polyethylene can be drawn into the shape of a film from a melt of the polymer. The t-butyl-hydroxyanisole used was added to the ethylene polymerization reaction mixture prior to its discharge from the reaction zone.

| Run | 1 | 2 | 3 | 4 | 5 |
|---|---|---|---|---|---|
| Polymerization Temp. °C | 227 | 240 | 223 | 223 | 229 |
| Di-ethyl peroxide p.p.m. on $C_2H_4$ | 85 | 85 | 300 | 300 | 300 |
| Conversion (percent) | 22 | 24 | 24 | 17 | 3 |
| T-butyl-hydroxyanisole wt. percent on benzene | | | 0.01 | 0.025 | 0.08 |
| Film Draw: | | | | | |
| Ft./min | 66 | 108 | 234 | 189 | |
| Percent Standard | 66 | 109 | 242 | 206 | |
| Transparency (percent) | 26 | 15 | 76 | 163 | |
| T-butyl-hydroxyanisole in polymer (p.p.m.) | | | 50 | 180 | |
| Distribution of T-butyl-hydroxyanisole: | | | | | |
| Percent to polymer | | | 30.2 | 37.8 | 15.6 |
| Percent to benzene | | | 6.5 | 24.3 | 15.0 |
| Percent to $H_2O$ | | | 5.0 | 7.2 | 23.6 |
| Percent to off gas | | | 0.1 | 0.1 | Negl. |
| Percent lost | | | 58.0 | 30.6 | 46.0 |

Any suitable type of dispersing agent may be employed if a polymer of ethylene is to be produced in the dispersed phase and for this purpose such dispersing agents as sulfonated white oil, the alkali metal salts of the sulfonated long chain fatty oils and alcohols as well as other well-known dispersing agents may be used.

The process of the invention, while described principally for inhibiting degradation during the preparation of solid polymers of ethylene, may likewise be used during the copolymerization of ethylene with other polymerizable organic compounds in which, for example, ethylene is copolymerized with other monoolefins, e.g., propylene, butylene, amylene, etc.; with halogenated monoolefins, e.g., tetrafluoroethylene, 1,2-dichloroethylene and 2-chloropropylene-1; vinyl ethers, ketones and esters and other vinyl compounds such as methyl and propyl vinyl ether, vinyl sulfonic esters, vinyl acetate, and vinyl chloride; acrylic and methacrylic acids, amides, nitriles and the like. The use of the polymerization decelerators is likewise of value in the post-copolymerization phases of the process.

I claim:

1. In a process for the preparation of an improved stable solid polymer of ethylene, the steps which comprise polymerizing ethylene under pressures between 30 and 3000 atmospheres and temperatures up to 200° C. in the presence of a polymerization catalyst and after the ethylene polymerization reaction is completed adding a butylated hydroxyanisole to the extent of 10 to 200 p.p.m. of the ethylene polymer to the mixture of reaction products prior to discharging them from the pressure of the reaction zone to atmospheric pressure.

2. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction mixture from the reaction zone, the step which comprises adding to the reacting mixture as it is being discharged from the zone of reaction, a polymerization decelerator in sufficient amounts to destroy the effectiveness of the catalyst and also in sufficient amounts to inhibit chain branching, cross-linking and oxidation of the ethylene polymer produced.

3. The process of claim 2 in which the decelerator is added to the extent of 10 to 200 p.p.m. of the ethylene polymer.

4. The process of claim 2 in which the decelerator is a substituted phenyl amine.

5. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of reaction, a butylated hydroxyanisole in sufficient amounts to destroy the effectiveness of the catalyst and also in sufficient amounts to inhibit chain branching, cross-linking and oxidation of the ethylene polymer produced.

6. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of reaction, diphenyl paraphenylenediamine in sufficient amounts to destroy the effectiveness of the catalyst and also in sufficient amounts to inhibit chain branching, cross-linking and oxidation of the ethylene polymer produced.

7. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of reaction, a 2-tertiary alkyl-4-alkoxy phenol in sufficient amounts to inhibit chain branching, cross-linking and oxidation of the ethylene polymer produced.

8. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of the reaction, N,N'-phenyl-naphthyl-ethylene diamine in sufficient amounts to destroy the effectiveness of the catalyst and also in sufficient amounts to inhibit chain branching, cross-linking and oxidation of the ethylene polymer produced.

9. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of reaction, dodecyl-alpha-naphthylamine in sufficient amounts to destroy the effectiveness of the catalyst and also in sufficient amounts to inhibit chain branching, cross-linking and oxidation of the ethylene polymer produced.

10. In a process for inhibiting the degrading influence of and the formation of cross-linkages by ethylene polymerization catalysts on ethylene polymers after the polymerization reaction has been conducted at a temperature up to 240° C., under pressures between 30 and 3,000 atmospheres in the presence of an ethylene polymerization catalyst and during the discharge of the reaction from the reaction zone, the step which comprises adding to the reacting mixture as it is being discharged from the zone of reaction, p,p'-diaminodiphenyl methane in sufficient amounts to destroy the effectiveness of the catalyst and also in sufficient amounts to inhibit chain branching, cross-linking and oxidation of the ethylene polymer produced.

References Cited in the file of this patent

UNITED STATES PATENTS

| | | |
|---|---|---|
| 2,566,537 | Schmerling | Sept. 4, 1951 |
| 2,662,876 | Antlfinger | Dec. 15, 1953 |